(12) United States Patent
Grewal et al.

(10) Patent No.: US 11,156,032 B2
(45) Date of Patent: Oct. 26, 2021

(54) WINDOW AND DOOR SCREEN FOR SEAMLESS, EASY REPAIRS

(71) Applicants: Sukhjit S. Grewal, Modesto, CA (US); Gauravedeep S. Grewal, Modesto, CA (US)

(72) Inventors: Sukhjit S. Grewal, Modesto, CA (US); Gauravedeep S. Grewal, Modesto, CA (US)

( * ) Notice: Subject to any disclaimer, the term of this patent is extended or adjusted under 35 U.S.C. 154(b) by 455 days.

(21) Appl. No.: 14/797,150

(22) Filed: Jul. 12, 2015

(65) Prior Publication Data
US 2017/0009523 A1 Jan. 12, 2017

(51) Int. Cl.
| | | |
|---|---|---|
| E06B 9/52 | (2006.01) | |
| B29C 65/00 | (2006.01) | |
| B29C 73/10 | (2006.01) | |
| B29C 65/48 | (2006.01) | |

(52) U.S. Cl.
CPC ............ *E06B 9/52* (2013.01); *B29C 65/4825* (2013.01); *B29C 66/24245* (2013.01); *B29C 66/43* (2013.01); *B29C 66/71* (2013.01); *B29C 66/727* (2013.01); *B29C 73/10* (2013.01); *E06B 2009/524* (2013.01); *E06B 2009/525* (2013.01)

(58) Field of Classification Search
CPC ......... E06B 2009/524; E06B 2009/525; E06B 9/52; E06B 2009/527; B29C 65/48; B29C 65/4825; B29C 65/72; B29C 66/242; B29C 66/2424; B29C 66/24243; B29C 66/24244; B29C 66/24245; B29C 66/43; B29C 66/472; B29C 66/71; B29C 66/727; B29C 73/10; B29C 73/14

USPC .. 156/60, 63, 64, 71, 94, 98, 148, 247, 249, 156/250, 252, 256, 258, 263, 264, 265, 156/266, 289, 297, 299; 29/401.01, 29/402.03, 402.08, 402.09, 402.11; 428/63, 98, 192, 193; 52/656.7, 660, 52/663, 664, 676
See application file for complete search history.

(56) References Cited

U.S. PATENT DOCUMENTS

| | | | | |
|---|---|---|---|---|
| 2,283,803 | A * | 5/1942 | Gittens | .............. E06B 9/52 245/2 |
| 3,261,393 | A * | 7/1966 | Templeton | ............. E06B 9/52 160/237 |
| 3,308,875 | A * | 3/1967 | Abrams | ............. A47H 23/04 160/237 |

(Continued)

*Primary Examiner* — Philip C Tucker
*Assistant Examiner* — Brian R Slawski
(74) *Attorney, Agent, or Firm* — The Rapacke Law Group P.A.

(57) ABSTRACT

A window screen that allows for the easy fix of a torn screen. The screen is similar to contemporary window screens. However, this screen contains a grid of squares that can be between 4×4 inches and 8×8 inches in size. The border of each square is a solid fiberglass material which can be 0.5 to 1.0 inch in width. Inside of each square is standard window screen mesh. In the event of a tear, the mesh within the borders of the squares can be cut out. Then, a replacement patch which is the same shape of the removed area can be adhered in place. The patch should be cut so that it contains the surrounding fiberglass border. The border of the patch will be adhered to the window screen so that the borders of the patch overlap the borders on the screen making for a seamless repair.

6 Claims, 5 Drawing Sheets

(56) References Cited

U.S. PATENT DOCUMENTS

| | | | | |
|---|---|---|---|---|
| 4,163,817 | A * | 8/1979 | DiCarlantonio | E06B 9/52 24/696 |
| 4,222,162 | A * | 9/1980 | Levy | B23P 6/00 245/1 |
| 6,250,040 | B1 * | 6/2001 | Green | E06B 3/72 52/455 |
| 6,805,937 | B1 * | 10/2004 | Toth | E06B 9/52 245/2 |
| 2008/0032085 | A1 * | 2/2008 | Hendriksen | B29C 73/10 428/63 |

* cited by examiner

WINDOW AND DOOR SCREEN FOR SEAMLESS, EASY REPAIRS

BACKGROUND OF THE INVENTION

This invention relates to the traditional fiber glass mesh commonly used in our daily life for doors and windows in our homes to protect us from insects and at the same time allow us to breathe fresh air by keeping our doors and windows open. Often times, we face this fiber glass door/window mesh damaged by accidental cuts, pokes, and rips either by pets or countless other causes that result in damage to the screen mesh. Even though we want to repair or replace the screen mesh, this cannot be easily and quickly done. Due to our day-to-day busy lives, we hardly find time to: (1) contact someone to fix the screen mesh, (2) take the screen mesh someplace so that it can be fixed, or (3) go to a store to buy new mesh so that we can repair it at home. Ultimately, we end up either getting used to a torn screen mesh and decide to just live with it or we try to patch it with some sort of adhesive tape.

In order to replace a torn screen mesh with a new window/door screen mesh ourselves, we will need to buy a roll of mesh and do the repair at home which can become expensive and time consuming. Also, it should be mentioned that many of us may not have the proper tools or skills to perform the repair. For most of us, the best that we can do is to go to the store and buy screen mesh repair patches and stick those patches on the damaged/torn out mesh areas of our torn screens. These patches are as good as the tape repair method, except that these patches have adhesive applied on the mesh pieces as compared to tape which is inherently an adhesive on a piece of medium such as plastic, but without tiny square holes which allow for the passage of air. Both of these remedies cure the torn window/door screen mesh to prevent insects from coming in the house, but result in the door/screen mesh looking ugly, dark, with noticeable repairs and compromised aesthetic value. The repair with packaging tape and glued mesh repair patches do not match and mingle with the body of the screen mesh and give an ugly look to the repaired window/door screen mesh. The mesh repair patch with its adhesive also catches dust over a period of time which causes it to darken when dust has settled on it. The repaired mesh portion also overlaps existing screen mesh and is often seen with fiber glass threads hanging out or crumpled and stuck together. The other alternative of replacing the entire damaged window/door screen mesh is not only expensive and time consuming, but also results in a lot of waste which ultimately reaches a landfill.

SUMMARY OF THE INVENTION

The motive behind this invention is to make screen mesh repair an easy, pleasant, do-it-yourself job that is convenient, inexpensive, and minimizes the potential for waste.

The invented window/door screen mesh is designed to have an augmented grid which runs vertically and horizontally, forming squares of a certain desired width (variable for different uses) in the body of the screen mesh.

Each roll of screen mesh would have an augmented grid of squares of the same size throughout the roll. Different rolls of screen mesh can have different square sizes. For example, if a torn screen mesh at home has 4" augmented grid squares, you can go to a store and purchase a 4" window/door mesh repair kit which also has 4" grid square lines.

Upon damage of any one or more squares in a door/window screen mesh, these squares can be easily repaired by cutting the mesh within the square grid area and replacing with the same size square mesh repair adhesive patch. It will make the damaged screen mesh repair look clean, invisible, and symmetrical while also being economical and environmentally-friendly.

A main object of this invention is to provide a screen mesh which is designed to create a seamless and convenient repair in the event of a tear to the screen mesh, itself.

A further object of this invention is to provide a screen mesh patch which can be used to create a patch used to perform repairs.

DETAILED DESCRIPTION

Figure 1:
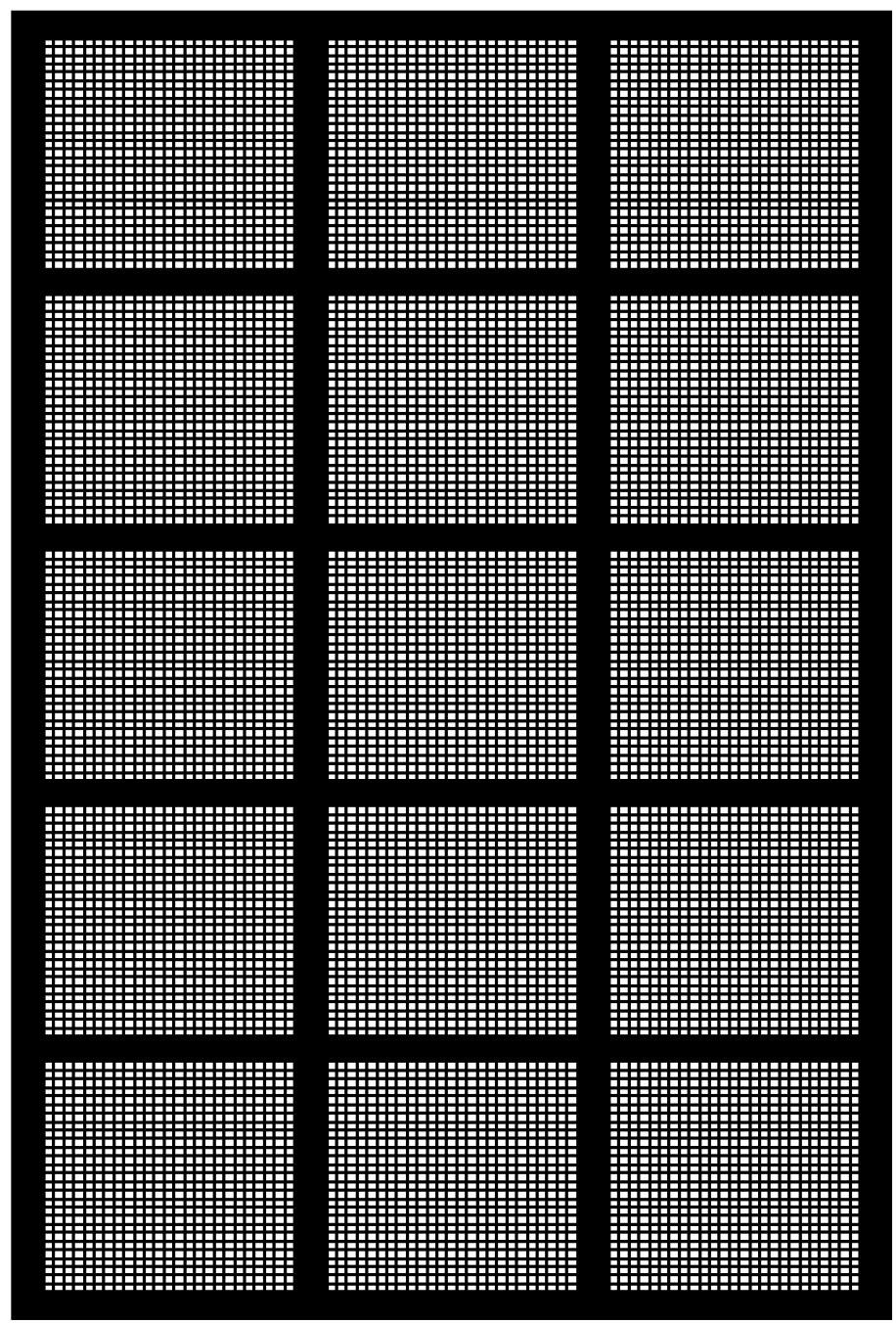
FIG. 1 is a screen mesh as it can appear on a window or door in excellent condition.

FIG. 1 represents an augmented grid screen mesh as it may exist within a frame for a sliding door or window. Note that the actual frame is not pictured within this image. This screen mesh contains the augmented grid that allows for an easy repair should there be a rip or tear within the screen mesh.

Figure 2:
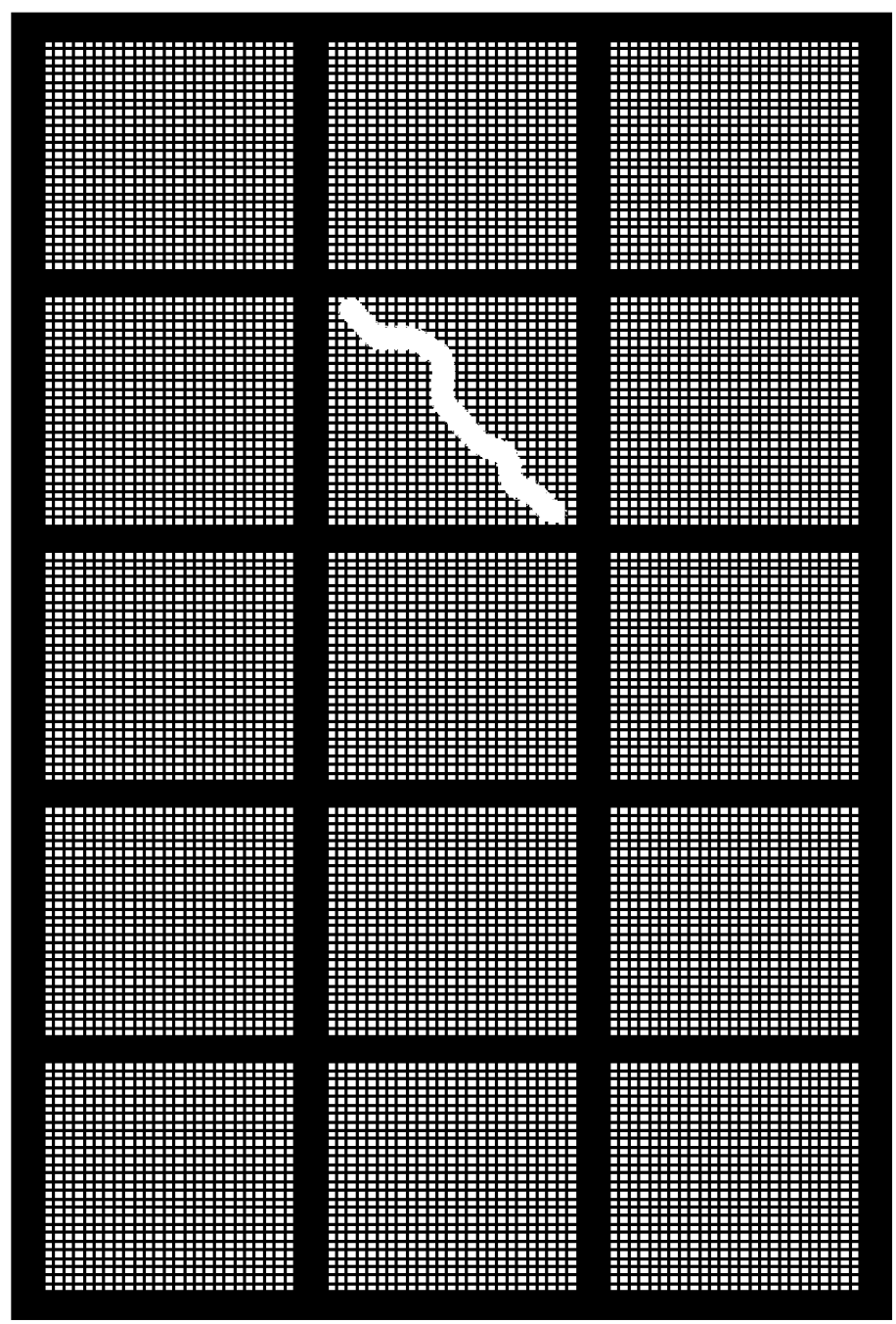
FIG. 2 is the screen mesh in FIG. 1, after it has incurred a tear.

FIG. 2 represents the same screen mesh shown in FIG. 1. However, there is now a tear which as affected the integrity of this screen mesh. This screen mesh will now need to be repaired so that there is no longer a tear within the screen mesh.

Figure 3:
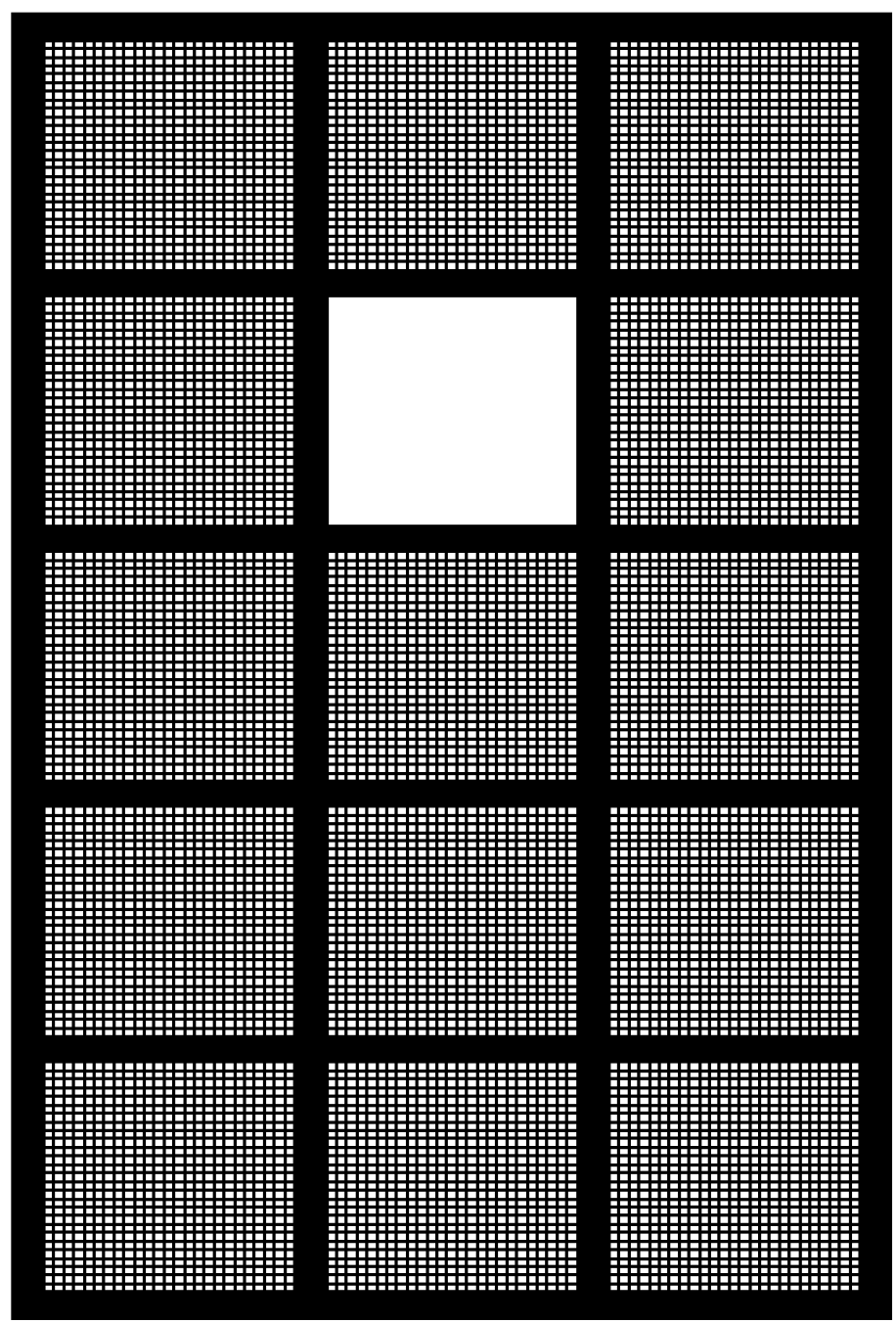
FIG. 3 is the screen mesh in FIG. 2, after the torn area of the mesh has been cut out and removed.

FIG. 3 represents the same screen mesh shown in FIG. 2. However, the torn area which was identified in FIG. 2 has now been cut out with a pair of scissors or knife and has been removed. Note that only the fine screen mesh which existed within the augmented grid was removed. The augmented grid is left in place so that a seamless repair can be made.

Figure 4:
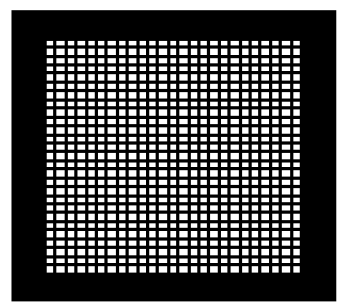
FIG. 4 is the screen mesh repair patch will be used to repair the screen mesh shown in FIG. 3.

FIG. 4 represents a repair patch which is the same size as the squares on the augmented grid screen mesh shown in FIG. 3. The repair patch is also of the same fiberglass material, color, and build specifications as the augmented grid screen mesh shown in FIG. 3. This repair patch will be adhered to the augmented grid screen mesh shown in FIG. 3.

Figure 5:
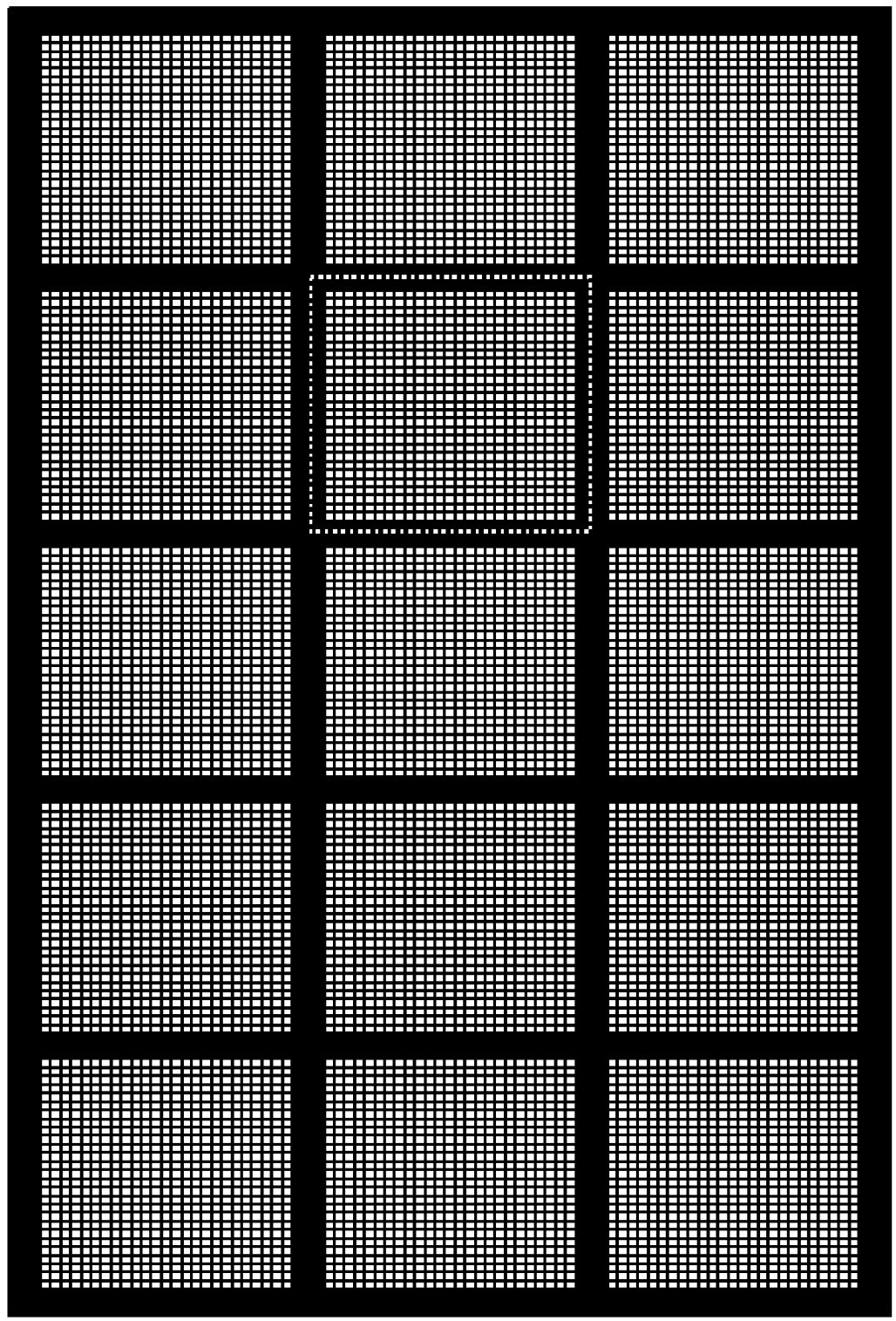
FIG. 5 is the screen mesh in FIG. 3 which now has the screen mesh repair patch that in FIG. 4 adhered to the screen mesh. The white dotted line indicates the approximate location of the screen mesh repair patch on the screen mesh.

FIG. 5 represents a repaired augmented grid screen mesh. The repair patch from FIG. 4 has been adhered to the prepared augmented grid screen mesh in FIG. 3. to complete the repair. The white-dotted line in FIG. 5 is used to help identify the approximate location of the repair patch. The actual augmented grid screen mesh does not show any indications of a repair patch since the repair is virtually seamless.

What is claimed is:

1. A mesh screen, comprising:
   an augmented grid comprising a plurality of vertical members and a plurality of horizontal members arranged in an approximately cross-hatching pattern wherein the augmented grid defines a plurality of through-holes;

a plurality of replaceable mesh portions disposed within the plurality of through holes wherein each of the replaceable mesh portions comprises a plurality of vertical mesh fibers arranged in an approximately cross-hatching pattern with a plurality of horizontal mesh fibers; and wherein each of the replaceable mesh portions is removably attached to the augmented grid.

2. A mesh screen as set forth in claim 1, wherein the augmented grid and the plurality of replaceable mesh portions comprise a fiberglass material.

3. A mesh screen as set forth in claim 1, wherein each of the through holes range from about 16 square inches to about 84 square inches in size.

4. A mesh screen as set forth in claim 1, wherein the plurality of replaceable mesh portions have at least 59% openness.

5. A mesh screen as set forth in claim 1, wherein the plurality of replaceable mesh portions have at least 69% light transmission.

6. A mesh screen, comprising:

an augmented grid comprising a plurality of vertical members and a plurality of horizontal members arranged in an approximately cross-hatching pattern wherein the augmented grid defines a plurality of through-holes ranging from about 16 square inches to about 84 square inches in size;

a plurality of replaceable mesh portions disposed within the plurality of through holes wherein each of the replaceable mesh portions comprises a plurality of vertical mesh fibers arranged in an approximately cross-hatching pattern with a plurality of horizontal mesh fibers;

wherein each of the replaceable mesh portions is removably attached to the augmented grid;

wherein the plurality of replaceable mesh portions have a burst strength of at least 92 PSI;

wherein the plurality of replaceable mesh portions have at least 69% light transmission;

wherein the plurality of replaceable mesh portions have at least 59% openness;

wherein each of the vertical mesh fibers and the horizontal fibers range from about 0.010 inch to about 0.011 inch in diameter; and wherein the plurality of vertical members and the plurality of horizontal members each range from about 0.5 inch to about 1.0 inch in width.

* * * * *